Aug. 5, 1969  C. E. BENDER ET AL  3,459,185
AMPULE FOR FREEZE DRIED BIOLOGICAL MATERIAL MAINTAINED UNDER
PARTIAL VACUUM CONDITIONS AND METHOD OF OBTAINING SAID
BIOLOGICAL MATERIAL FROM SAID AMPULE WITHOUT
CONTAMINATING THE SURROUNDING ATMOSPHERE
Filed Jan. 10, 1966

INVENTOR.
CHARLES E. BENDER
MARTIN C. PARKINSON
BY
ATTORNEY.

United States Patent Office 3,459,185
Patented Aug. 5, 1969

3,459,185
AMPULE FOR FREEZE DRIED BIOLOGICAL MATERIAL MAINTAINED UNDER PARTIAL VACUUM CONDITIONS AND METHOD OF OBTAINING SAID BIOLOGICAL MATERIAL FROM SAID AMPULE WITHOUT CONTAMINATING THE SURROUNDING ATMOSPHERE
Charles E. Bender, New Paltz, and Martin C. Parkinson, Beacon, N.Y., assignors to The Virtis Company, Inc., Gardiner, N.Y., a corporation of New York
Filed Jan. 10, 1966, Ser. No. 529,618
Int. Cl. A61j 1/00
U.S. Cl. 128—272
2 Claims

ABSTRACT OF THE DISCLOSURE

A heat sealable evacuated ampule having means to permit safe and controlled opening. A filter is retained between score means, the upper one being located for controlled opening above the filter to permit the pressure to be equalized with the inrushing air being filtered. The lower score means permits the filter to be removed and provides for access to the container contents. A desiccant and/or means to indicate the presence of moisture may be supported on the filter.

---

This invention relates to an ampule for the reception of biological material which is maintained under partial vacuum conditions. The invention also includes a method of utilizing the biological material contained within the ampule without the possibility of contaminating the surrounding atmosphere.

It is conventional to preserve various types of biological material such as vaccines, viruses, and the like by freeze-drying such material and maintaining it within an ampule or other container under partial vacuum conditions. So long as the material is freeze-dried, and so long as moisture does not enter the container, the material is preserved almost indefinitely. However, if the container should be ruptured and the vacuum lost and moisture enter the container, the biological material contained therein is on longer preserved.

Furthermore, in this type of container, certain biological materials are utilized which are extremely toxic if breathed or otherwise ingested. For example, if Smallpox vaccine is contained within the ampule, and the vaccine should contaminate the atmosphere and get into the eyes of the user of the material, blindness may ensue.

In the conventional ampule there is no method provided wherein a user can determine whether or not vacuum conditions have been maintained within the ampule or whether moisture has entered. Conventionally, in order to obtain some type of check, the user of the ampule listens for the "hiss" of atmospheric air entering the ampule. This is not always a proper indication of lack of contamination since moisture might be present in the ampule despite the fact that a vacuum is still present.

Furthermore, in the conventional type of ampule, the breaking thereof will, in many cases cause the material contained therein to spurt out of the ampule and may contaminate the room in which the ampule is opened. The material may, for example, get into the eyes of the operator and cause blindness.

In order to avoid the objections set forth hereinabove to the conventional structure the instant ampule of this invention has been constructed. The invention also includes the novel method steps involved herein preventing the user of freeze-dried material from becoming contaminated therewith.

The above sets forth a brief description of the instant invention and some of the objects and advantages thereof. Other objects and advantages of this invention will become obvious to the reader of this specification as the description proceeds.

The invention will now be described by reference to the accompanying drawings which represent the best mode known to the inventors of carrying out their invention.

Figure 1:
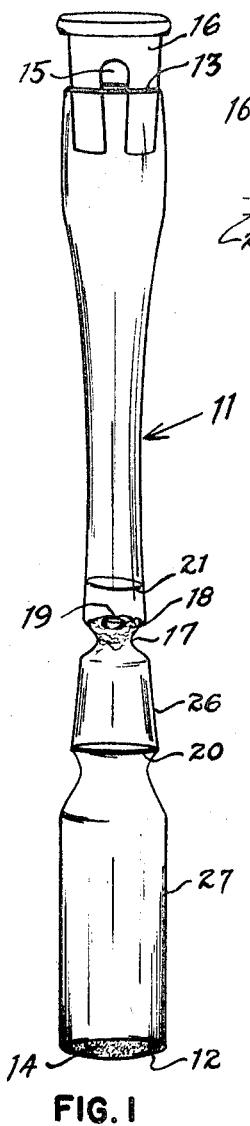
FIG. 1 is a perspective view of an ampule made in accordance with this invention showing the manner in which the biological material is freeze-dried.

The invention will now be further described by reference to the specific form thereof shown in the accompanying drawings. In this connection, however, the reader is informed that the specific form of this invention as set forth herein is for illustrative purposes and for purposes of example only. Various changes and modifications can obviously be made within the spirit and scope of this invention and would occur to those skilled in this art.

The ampule 11 of this invention is formed with a closed bottom 12 and an initially open top 13. A stopper 16 is placed within top 13 and normally contains a transverse groove 15. Initially stopper 16 is ajar within mouth 13 so as to provide for freeze-drying of the contents thereof as will be subsequently explained. The biological material to be freeze-dried 14 is placed within container 11 and lies adjacent bottom 12. An inwardly constricted portion or neck 17 is provided within container 11 intermediate bottom 12 and top 13. A porous plug or filter means 18 is retained within the ampule by portion 17. Adjacent porous plug 18 is desiccating material 19 which preferably contains colorimetric indicating material associated therewith.

A first breakable portion 20 (preferably consisting of an inwardly scored circumferential line) is disposed upon an ampule on one side of and substantially below the plug 18 and above material 14. A second breakable portion 21 (again preferably consisting of an inwardly scored circumferential line) is disposed on the opposite side of plug 18.

In the use of the ampule of this invention the sides thereof are fused together below top 13 and the portion 22 discarded. A new fused portion 23 is then provided which is formed therewithin by means of the impingement of sealing jets 24.

With the foregoing specific description the operation of this invention may now be explained.

Figure 2:
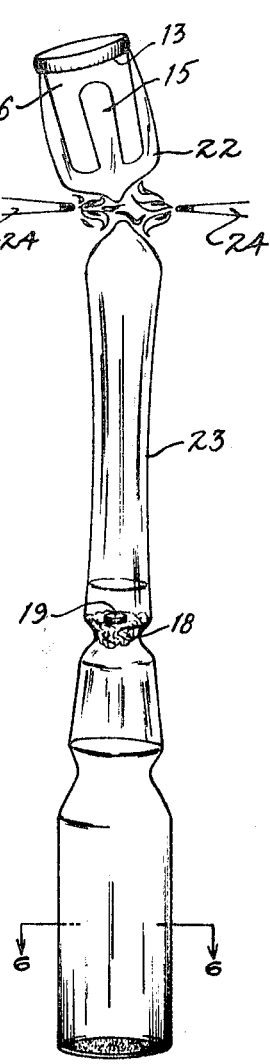
FIG. 2 is a view similar to that of FIG. 1 but showing the stopper means in closed position and the manner in which the ampule is sealed after the biological material is freeze-dried.

The ampule of this invention is initially prepared and material to be freeze-dried 14 placed therein adjacent the bottom thereof. The porous plug 18 is then placed within ampule 11 and is retained by constricted portion 17. The desiccating material (which is preferably a molecular sieve consisting of a synthetic zeolite) is then placed above plug 18 and may be impregnated with colorimetric humidity indicating material such as cobalt chloride. The ampule is now attached to conventional freeze-drying apparatus with stopper 16 ajar and the freeze-drying process continued until material 14 is properly freeze-dried. At that point stopper 16 is placed within mouth 13 of the ampule in closed position so as to maintain a vacuum within the ampule. Sealing jets 24—24 are then placed in impingement with ampule 11 as shown in FIG. 2 and the ampule then sealed, discarding portion 22.

After storage of the material the operator looks at the ampule and determines whether or not the colorimetric indicating material still indicates a lack of moisture. If cobalt chloride is used, for example, the material will either be blue or the ampule must be discarded. A pink coloration of the cobalt chloride indicates that humidity contamination has occurred. The desiccating material contained within the ampule also tends to remove any residual moisture that may have been present within the ampule during the freeze-drying process.

Figure 3:
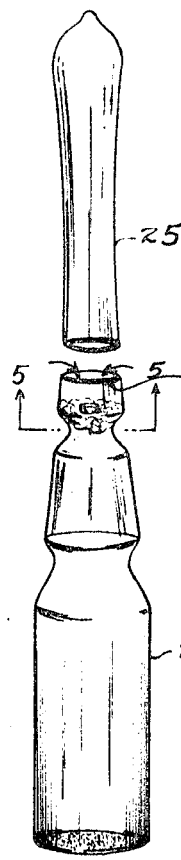
FIG. 3 is a perspective view showing the manner in which the sealed ampule is first opened to avoid contamination of the material contained therein.
Figure 5:
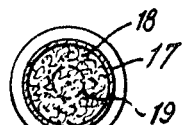
FIG. 5 is a sectional view taken along lines 5—5 of FIG. 2.
Figure 4:
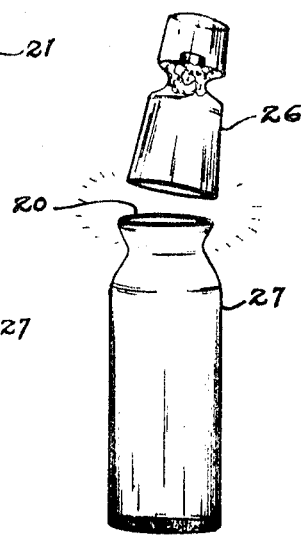
FIG. 4 is a perspective view showing the second step of opening the ampule to avoid spurting of the contents into the air of the room and contaminating it.
Figure 6:
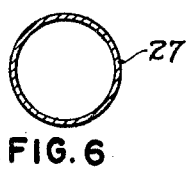
FIG. 6 is a sectional view taken along lines 6—6 of FIG. 2.

Assuming that the colorimetric material still indicates a lack of moisture and therefore lack of contamination within the ampule the ampule is then broken along line 21 and portion 25 discarded. Air will then rush in to the ampule in the direction of the arrows shown in FIG. 3 but, since plug material 18 is present between the point of opening of the ampule and biological material 14 there will not be any squirting of the biological material within the air but this material will be contained within the ampule by plug 18. After portion 25 is discarded the ampule is then broken along line 20 and portion 26 discarded. At this point, since there no longer is any partial vacuum in the ampule, there can be no spurting of the biological material outside of the ampule. As a result there can be no contamination. The portion 27 of ampule 11 is now utilized as a conventional container, water is added to reconstitute the material contained therein, and the material is used conventionally.

The foregoing sets forth the manner in which the objects of this invention are achieved.

We claim:

1. A container being under a partial vacuum, said container being formed of heat fusable glass and comprising a hollow tubular body having a closed bottom and upstanding walls terminating in a heat fusable closable top, said top being closed off prior to heat sealing with a split stopper, a holding means formed between said top and bottom portions within said container body, a filter means supported above said holding means, a specimen disposed within said container below said filter means, and at least two score marks formed in said container walls on opposite sides of said filter means, said score marks being axially spaced from said filter means to permit controlled separation of said ampule initially along the score mark above said filter means to break the vacuum and controlled separation below said filter means to gain access to said container.

2. A container as described in claim 1 wherein a desiccating material and colorimetric humidity indicating material is disposed above said filter means.

References Cited

UNITED STATES PATENTS

| | | | |
|---|---|---|---|
| 2,372,182 | 3/1945 | Barr | 215—33 |
| 2,477,926 | 8/1949 | Greaves | 128—272 |
| 2,896,807 | 7/1959 | Shaw | 128—272 X |

FOREIGN PATENTS

| | | |
|---|---|---|
| 1,017,067 | 9/1952 | France. |
| 323,394 | 12/1934 | Italy. |
| 80,904 | 7/1934 | Sweden. |

DALTON L. TRULUCK, Primary Examiner

U.S. Cl. X.R.

215—32